United States Patent
Han et al.

(10) Patent No.: US 6,946,020 B2
(45) Date of Patent: Sep. 20, 2005

(54) HYDROGEN PURIFICATION MODULE

(75) Inventors: Jae-Sung Han, Taejon (KR); Il-Su Kim, Taejon (KR); Keun-Seob Choi, Taejon (KR)

(73) Assignee: SK Corporation, Seoul (KR)

( * ) Notice: Subject to any disclaimer, the term of this patent is extended or adjusted under 35 U.S.C. 154(b) by 0 days.

(21) Appl. No.: 10/492,983

(22) PCT Filed: Oct. 21, 2002

(86) PCT No.: PCT/KR02/01969

§ 371 (c)(1),
(2), (4) Date: Apr. 16, 2004

(87) PCT Pub. No.: WO03/035547

PCT Pub. Date: May 1, 2003

(65) Prior Publication Data

US 2004/0255782 A1 Dec. 23, 2004

(30) Foreign Application Priority Data

Oct. 26, 2001 (KR) .......................... 2001-66399

(51) Int. Cl.[7] .......................... B01D 53/22; B01D 71/02
(52) U.S. Cl. .................... 96/7; 95/56; 96/11
(58) Field of Search .................. 95/55, 56; 96/4, 96/7, 9, 11; 55/523, 524

(56) References Cited

U.S. PATENT DOCUMENTS

| | | | | | |
|---|---|---|---|---|---|
| 2,597,907 | A | * | 5/1952 | Steiner et al. | 96/7 |
| 2,618,357 | A | * | 11/1952 | Harlow | 96/7 |
| 2,824,620 | A | * | 2/1958 | De Rosset | 95/56 |
| 3,336,730 | A | * | 8/1967 | McBride et al. | 95/56 |
| 3,486,301 | A | * | 12/1969 | Bonnet | 96/7 |
| 3,520,803 | A | * | 7/1970 | Iaconelli | 210/640 |
| 3,534,531 | A | * | 10/1970 | Eguchi et al. | 96/7 |
| 3,564,819 | A | * | 2/1971 | Neulander et al. | 96/7 |
| 3,619,986 | A | * | 11/1971 | Mormont et al. | 96/7 |
| 3,735,559 | A | * | 5/1973 | Salemme | 95/52 |
| 3,793,111 | A | * | 2/1974 | Judkins | 156/253 |
| 3,837,146 | A | * | 9/1974 | Faure et al. | 96/7 |
| 3,854,904 | A | * | 12/1974 | Jamet | 96/7 |
| 3,979,190 | A | * | 9/1976 | Hedman | 96/7 |
| 4,239,728 | A | * | 12/1980 | Stenberg et al. | 422/46 |
| 4,243,536 | A | * | 1/1981 | Prolss | 210/321.84 |
| 5,225,080 | A | * | 7/1993 | Karbachsch et al. | 210/321.75 |
| 5,498,278 | A | | 3/1996 | Edlund | |
| 5,520,807 | A | * | 5/1996 | Myrna et al. | 210/321.75 |
| 5,536,405 | A | * | 7/1996 | Myrna et al. | 210/321.75 |
| 5,645,626 | A | | 7/1997 | Edlund et al. | |
| 5,681,373 | A | * | 10/1997 | Taylor et al. | 96/11 |
| 5,891,222 | A | * | 4/1999 | Hilgendorff et al. | 96/7 |
| 5,997,594 | A | | 12/1999 | Edlund et al. | |
| 6,258,270 | B1 | * | 7/2001 | Hilgendorff et al. | 210/321.75 |
| 6,332,913 | B1 | * | 12/2001 | Breitschwerdt et al. | 95/55 |
| 6,419,726 | B1 | * | 7/2002 | Frost et al. | 95/56 |
| 6,547,858 | B1 | * | 4/2003 | Edlund et al. | 96/4 |
| 6,660,069 | B2 | * | 12/2003 | Sato et al. | 96/4 |
| 2002/0124723 | A1 | * | 9/2002 | Frost et al. | 95/56 |
| 2004/0003720 | A1 | * | 1/2004 | Beisswenger et al. | 96/11 |

* cited by examiner

Primary Examiner—Robert H. Spitzer
(74) Attorney, Agent, or Firm—Evelyn H. McConathy, Esq; Drinker Biddle & Reath LLP

(57) ABSTRACT

A compact hydrogen purification module capable of affording high-grade purified hydrogen, easy assembly and easy control of size is disclosed. The module includes a plurality of unit cells. Each of the unit cells includes two metal membranes permeable only by hydrogen, a metal support ring attached between the metal membranes by diffusion bonding to support the metal membranes, and having a radial hole to allow hydrogen to flow therethrough, a porous plate disposed between the metal membranes to allow the hydrogen to flow therethrough, and a fitting coupled to the metal support ring and having a hole communicating with the hole of the metal support ring to allow the hydrogen to flow therethrough. The individual fittings are connected to each other so that hydrogen collected in the individual fittings is discharged through a hydrogen product line.

6 Claims, 4 Drawing Sheets

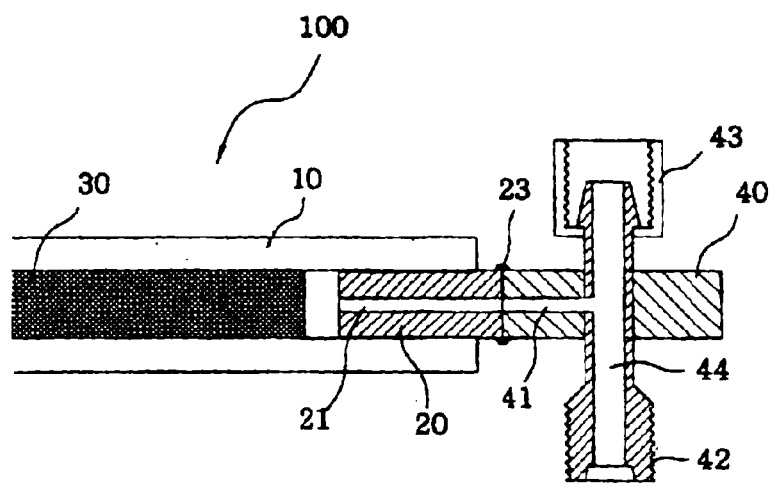
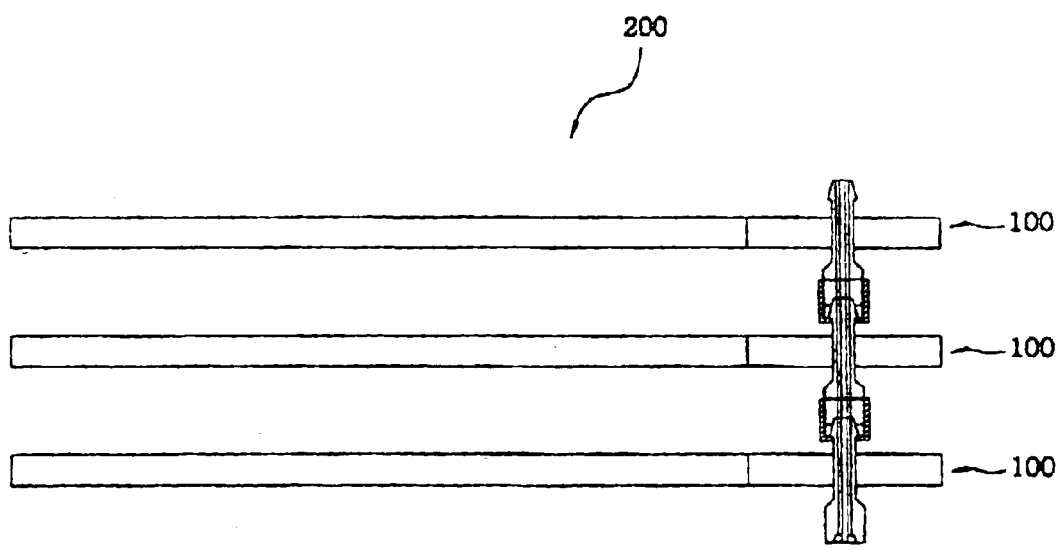

HYDROGEN PURIFICATION MODULE

BACKGROUND OF THE INVENTION

1. Field of the Invention

The present invention relates to a hydrogen purification module, and more particularly to a hydrogen purification module, which is comprised of unit cells, each having metal membranes permeable by hydrogen, by coupling individual fittings of the unit cells.

2. Description of the Prior Art

A hydrogen purification module is a device for purifying mixed gas containing hydrogen, or low-purity reformed hydrogen, into high-purity hydrogen. The hydrogen purification module functions to produce high-purity hydrogen by selectively extracting only pure hydrogen from reformed gas produced by reforming hydrocarbon fuel such as gasoline, ethanol, methanol and natural gas, low-purity general hydrogen, or mixed gases containing hydrogen.

The hydrogen purification module can be used in producing high-purity hydrogen from low-purity regular hydrogen, and can be used as a hydrogen purification module for a small fuel reformer, which serves to remove impurities such as CO, by being connected to a reformer for reforming hydrocarbon fuel such as gasoline, ethanol, methanol or natural gas. The hydrogen purification module can also be applied to a small sized fuel reforming apparatus of a small sized system for generating electrical energy in combination with a fuel cell system, and can be applied to a small fuel reformer of a fuel cell powered vehicle.

U.S. Pat. No. 5,498,278 discloses a hydrogen separation membrane and a hydrogen separation module having a hydrogen separation membrane. The hydrogen separation membrane is comprised of a hydrogen-permeable metal coating layer, a support matrix and a porous layer disposed between the metal coating layer and the support matrix. With the hydrogen separation membrane, a plate-and-frame type hydrogen purification module or a shell-and-tube type hydrogen purification module is produced. Purification of hydrogen in this type of hydrogen purification module is achieved at high temperatures of 200° C.–1000° C. However, this type of hydrogen purification module has not only heat loss but also a chance of leakage of purified hydrogen due to components such as gaskets. Furthermore, this type of hydrogen purification module has a complicated structure and a heavy weight.

U.S. Pat. No. 5,645,626 discloses a cylindrical hydrogen purification module. The hydrogen purification module includes an inlet, an hydrogen outlet, a raffinate outlet and a hydrogen-permeable membrane. In this type of hydrogen purification module, a coating metal layer, a support matrix and an intermediate layer of a flat plate are commonly formed with central vertical holes. There is the provision of a gas-tight seal around the periphery of the holes through a metal coating layer of the membrane to prevent the leakage of hydrogen. Hydrogen, permeated through the metal membrane, passes through the hole of the hydrogen-permeable metal membrane. The hydrogen-permeable membrane is provided with a peripheral hollow, which may be a notch, a slot, a series of notches or slots, or a truncated section at the perimeter thereof. Such a hydrogen purification module also has disadvantages in that its operational temperature is limited, it is not suitable to generate ultrapure hydrogen due to heat loss at flange, and its weight is increased due to the gasket.

U.S. Pat. No. 5,997,594 discloses a steam reformer within internal hydrogen purification, which includes a reforming chamber having a reformation catalyst for producing reformed gas containing hydrogen from feed gas, and a metal membrane for dividing the reformed gas into byproduct gas and hydrogen gas. The steam reformer is provided with a tube-shaped hydrogen-permeable membrane.

As described above, the above-mentioned conventional hydrogen purification modules have disadvantages in that it is difficult to achieve a compact structure due to their complicated structures, and to achieve high-purity hydrogen, due to leakage of purified hydrogen. Furthermore, conventional hydrogen purification modules have a disadvantage in that components such as gaskets are damaged at the temperatures required to purify hydrogen, resulting in heat loss.

In addition, though the conventional hydrogen purification modules must be simply and compactly constructed in order to be used in a small fuel reformer for fuel cell powered vehicles, conventional hydrogen purification modules cannot be compactly constructed because of complicated structures and assemblies.

SUMMARY OF THE INVENTION

Accordingly, the present invention has been made keeping in mind the above problems occurring in the prior art, and an object of the present invention is to provide a hydrogen purification module which is easily assembled and compactly constructed without heat loss or leakage of purified hydrogen.

In order to accomplish the above object, the present invention provides a hydrogen purification module which is manufactured by attaching metal membranes, permeable only by hydrogen, to a metal support ring by a diffusion-bonding technique to obtain an unit cell, and coupling a plurality of unit cells to each other via fittings, such as reducers or unions. These hydrogen purification modules can be configured into a desired size by arranging the hydrogen purification modules in series and/or in parallel by appropriate coupling of the fittings. Since the metal membranes are attached to the metal support ring by diffusion boding, and the unit cells are coupled to each other by the fittings without graphite or copper gaskets, there is no leakage of hydrogen even at high temperatures, and there is a provision of easy assembly and ultrapure hydrogen, having a purity more than 99.99999%.

According to an aspect of the present invention, there is provided a hydrogen purification module comprising: a plurality of unit cells, each of the unit cells comprising: two metal membranes which are selectively permeable only by hydrogen; a metal support ring disposed between the metal membranes and attached to the metal membranes at both its sides by diffusion bonding so as to support the metal membranes, the metal support ring being provided with a radial hole to allow hydrogen permeated through the metal membranes to flow therethrough; a porous plate disposed between the metal membranes so as to allow the hydrogen permeated through the metal membranes to flow therethrough; and a fitting coupled to the metal support ring, including a hole communicating with the hole of the metal support ring so as to allow the hydrogen in the porous plate to flow therethrough; wherein the individual fittings are connected to each other so that hydrogen collected in the individual fittings is discharged through a hydrogen product line. The plurality of unit cells may be coupled to each other by fittings to construct a unit module, and the individual unit modules may be arranged parallel to each other.

According to another aspect of the present invention, there is provided a hydrogen separation reactor comprising:

a housing receiving the hydrogen purification module; an inlet connected to the hydrogen purification module to allow mixed gases to be introduced into the hydrogen purification module therethrough; a hydrogen product line connected to the hydrogen purification module to discharge purified hydrogen by the hydrogen purification module; and a raffinate outlet, connected to the hydrogen purification module, to discharge the residual gases of the mixed gases.

BRIEF DESCRIPTION OF THE DRAWINGS

The above and other objects, features and advantages of the present invention will be more clearly understood from the following detailed description taken in conjunction with the accompanying drawings, in which:

FIG. 2 is a cross-sectional view of the unit cell of the hydrogen purification module shown in FIG. 1;

FIG. 3 is a cross-sectional view of a unit hydrogen purification module achieved by coupling via fittings the unit cells shown in FIG. 2;

DETAILED DESCRIPTION OF THE INVENTION

This invention will be described in further detail by way of example with reference to the accompanying drawings.

Figure 1:
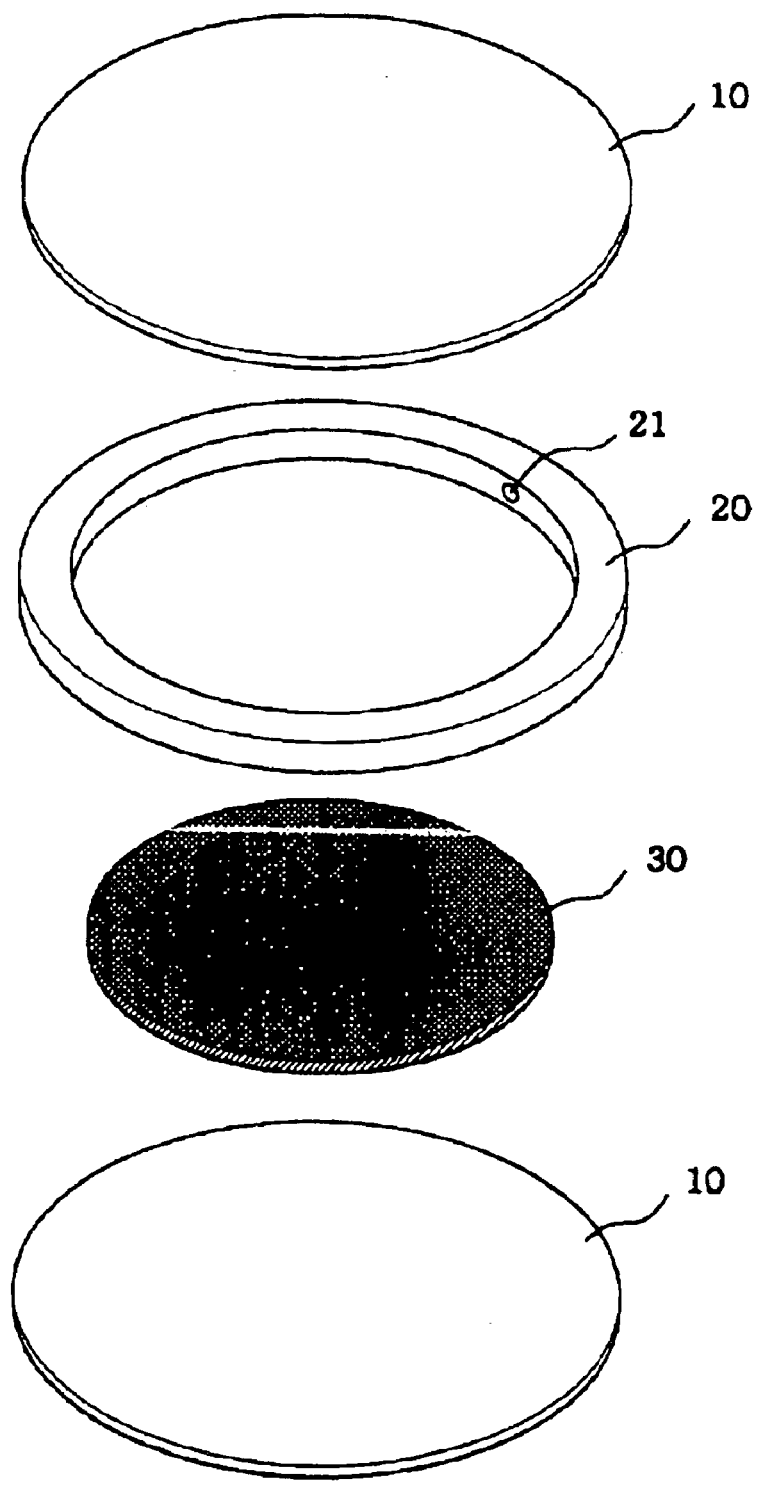
FIG. 1 is an exploded perspective view of a unit cell of a hydrogen purification module according to the present invention.

FIG. 1 is a perspective view showing a pair of metal membranes 10, a metal support ring 20 and a porous plate 30, and FIG. 2 is an enlarged cross-sectional view of a unit cell comprised of the metal membranes 10, the metal support ring 20, the porous plate 30 and a fitting 40.

The metal membranes 10 are selectively permeable only by hydrogen, and include Pd membranes, Pd alloy membranes and Pd coated membranes. The metal membranes 10 may further include composite membranes produced by coating V, Ni, or alloys thereof, with Pd. An example of such a metal membrane, which is selectively permeable only by hydrogen, is disclosed in U.S. Pat. No. 5,645,626.

According to the present invention, the metal membranes 10 are first attached to both sides of the metal support ring 20 by diffusion bonding. Interposed between the pair of metal membranes 10 is the porous plate 30, to allow hydrogen to be easily transmitted therethrough and to support the metal membranes. The porous plate 30 is made of metal mesh or porous metal.

Before the metal membranes 10 are attached to the metal support ring 20 by diffusion bonding, surfaces of the metal support ring 20 are preferably flattened and smoothed by chemical or mechanical polishing. In addition, the metal membranes 10 are scrubbed by a sandpaper having a fine grain size to remove oxide films in the metal membranes, and then provided with fine scratches to increase surface area, thereby maximizing the hydrogen-permeable area of the metal membranes.

The metal support ring 20 is formed with a radial hole 21 at its inner surface, so that hydrogen, which is permeated through the metal membranes, can pass therethrough. The metal support ring 20 is preferably, but not exclusively, made of a copper plate.

The fitting 40 is attached to the metal support ring 20. More specifically, the fitting 40 is bonded to the metal support ring 20 by welding 23 or brazing, such that the hole 41 formed at the fitting 40 coincides with the hole 21 of the metal support ring 20, so as to allow the hydrogen passed through the metal membranes to flow therethrough.

As shown in FIG. 2, the fitting 40 is formed with a vertical bore 44. The fitting 40 is further provided with a hole, which is horizontally positioned between the hole 21 of the metal support ring 20 and the vertical hole 44, to communicate with them. Consequently, the hydrogen, passed through the metal membranes 10, is collected in the vertical hole 44 of the fitting 40 through the hole 21 of the metal support ring 20 and the hole 41 of the fitting 40.

The fitting 40 used in the present invention is provided at one end with a female threaded part 43, and is provided at the other end with a male threaded part 42. Accordingly, the fittings 40 can be coupled to each other by coupling of the female and male threaded parts 43 and 42. However, the fitting according to the present invention is not limited to the above-mentioned configuration, and can be constructed into any other configuration suitable to the present invention. That is, various fittings such as reducers and unions may be used.

A plurality of unit cells, each of which is comprised of the metal membranes 10, the metal support ring 20, the porous plate 30 and a fitting 40, are coupled to each other by coupling the fittings 40 to construct a hydrogen purification module. The hydrogen purification module according to the present invention can be controlled in its size by selecting the number of the unit cells 100 as required.

Referring to FIG. 3, there is shown a hydrogen purification module 200. Hydrogen passed through the metal membranes 10 is introduced into the holes 21 of the metal support rings 20 through the porous plates 30. The hydrogen introduced into the holes 21 is introduced into the vertical bores 44 through the horizontal holes 41 of the fitting 40. The hydrogen introduced into the vertical bores 44 is collected by the coupled fittings 40 and is discharged through a hydrogen product line.

In this hydrogen purification module 200, the spacing defined between the unit cells is somewhat large due to the length of the fittings. In order to manufacture a compact hydrogen purification module by reducing the spacing between the unit cells, two or more unit modules can be disposed to be parallel to each other.

Figure 4:
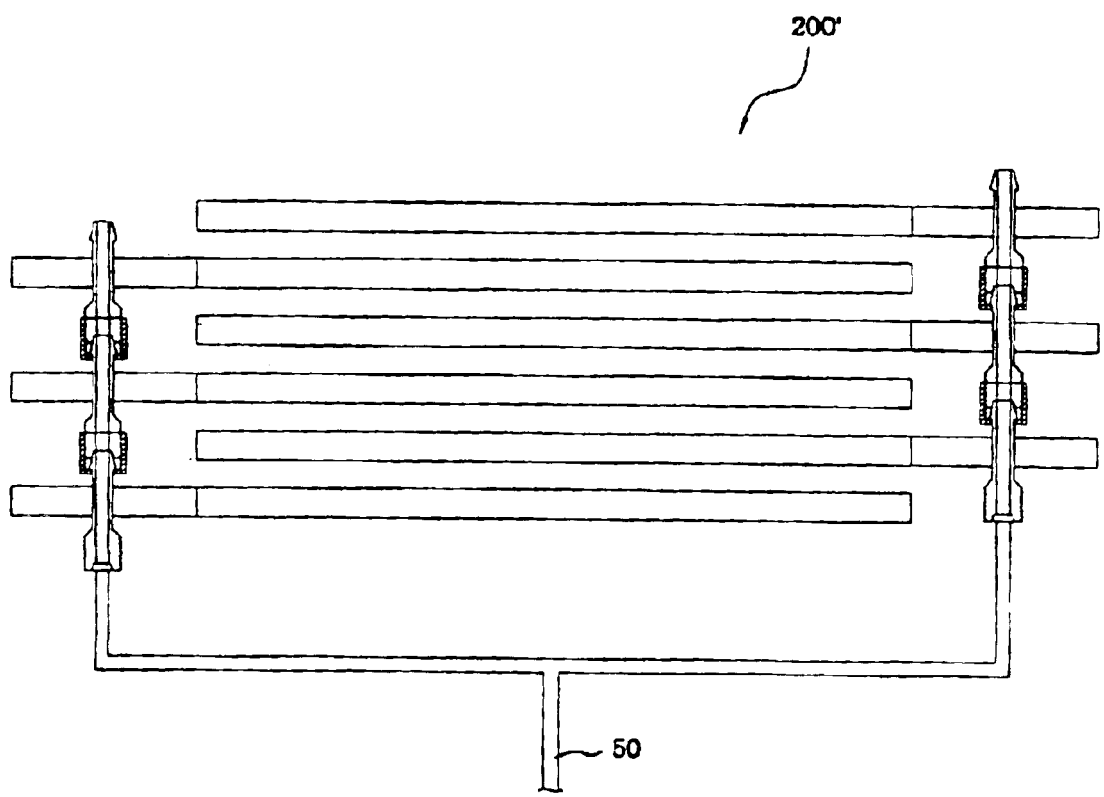
FIG. 4 is a cross-sectional view of a hydrogen purification module according to the present invention achieved by parallel combination of the unit hydrogen purification modules shown in FIG. 3.

More specifically, as shown in FIG. 4, two or more unit modules may be disposed side by side, such that the unit cells 100 of both unit modules are alternately arranged, so as to fabricate a compact hydrogen purification module 200'.

Hydrogen, collected in the fittings of the two or more unit modules, is merged at one or more hydrogen product lines 50 and sent therethrough. By this parallel arrangement of the hydrogen purification modules, it is possible to control the spacing between the adjacent unit cells and the number of the unit cells with respect to a given length of the fittings, thereby affording a compact hydrogen purification module.

Figure 5:
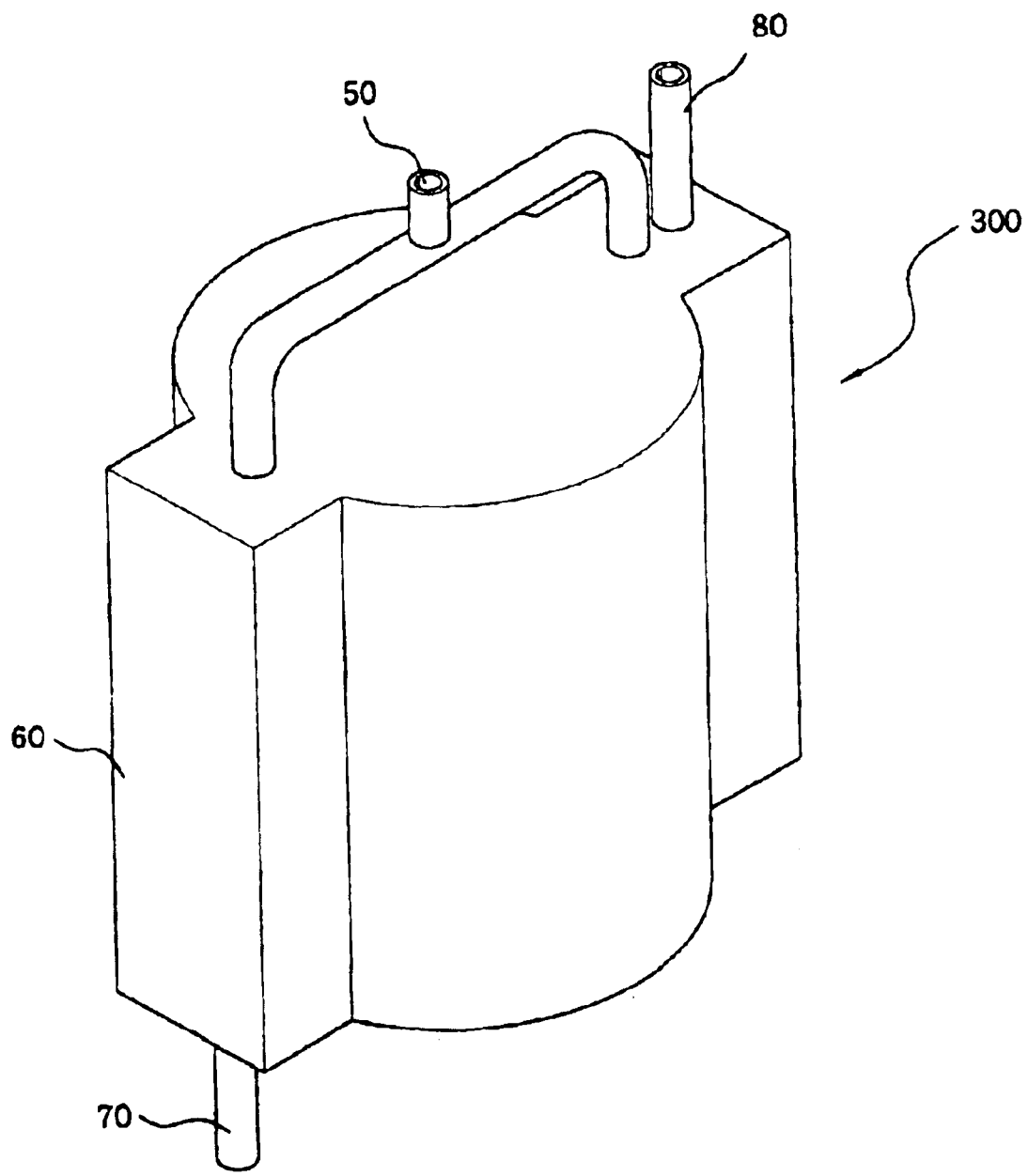
FIG. 5 is a perspective view of a hydrogen separation reactor receiving the hydrogen purification module shown in FIG. 4.

Referring to FIG. 5, there is shown a hydrogen separation reactor 300, which is provided with the hydrogen purification module according to the present invention.

The hydrogen separation reactor comprises a housing 60 receiving the hydrogen purification modules, a hydrogen product line 50, an inlet 70 for mixed gas, and a raffinate outlet 80.

In an operation of the hydrogen separation reactor 300, mixed gases, containing hydrogen, general hydrogen or low purity reformed hydrogen, are introduced into the hydrogen separation reactor through the inlet 70. The introduced gas is purified by the hydrogen purification modules received in the housing 60. From the introduced mixed gases, only hydrogen permeates the metal membranes of the hydrogen purification modules, and the permeated hydrogen is collected in the bores of the fittings of the hydrogen purification modules and is discharged through the hydrogen product line 50. Residual gases, those other than the hydrogen, are collected and then discharged through the raffinate outlet 80.

In this way, as hydrogen, which has selectively permeated through the metal membrane, flows into the bores 44 of the fittings 40 through the holes 21 of the metal support rings 20 bonded to the metal membranes 10 and the holes 41 of the fittings 40 welded to the metal support rings 20, there is no fear of leakage of hydrogen, thereby affording high-grade purification of hydrogen.

As described above, the present invention provides a hydrogen purification module, which can be selectively permeable to hydrogen contained in fixed gas, and can afford high-grade purification of hydrogen without any leakage of hydrogen.

Furthermore, since a plurality of hydrogen-permeable metal membranes can be easily coupled to each other by fittings allowing permeated hydrogen to pass therethrough, the hydrogen purification modules can be easily and compactly fabricated, and the size of the hydrogen purification module and the spacing between the unit cells can be easily controlled.

In addition, the hydrogen purification module according to the present invention can be used in a small sized apparatus for generating ultrapure hydrogen, and which also serves to remove impurities such as CO, by connection to a reformer for reforming hydrocarbon fuel such as gasoline, ethanol, methanol or natural gas. The hydrogen purification module can also be applied to a small sized fuel reforming apparatus of a small-sized system for generating electrical energy or a fuel cell-powered vehicle, by combination with a fuel cell system.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A hydrogen purification module comprising:
   a plurality of unit cells, each of the unit cells comprising:
   two metal membranes which are selectively permeable only by hydrogen;
   a metal support ring disposed between the metal membranes and attached to the metal membranes at both its sides by diffusion bonding so as to support the metal membranes, the metal support ring being provided with a radial hole to allow hydrogen permeated through the metal membranes to flow therethrough;
   a porous plate disposed between the metal membranes so as to allow the hydrogen permeated through the metal membranes to flow therethrough; and
   a fitting coupled to the metal support ring, including a hole communicating with the hole of the metal support ring so as to allow the hydrogen in the porous plate to flow therethrough;
   wherein the individual fittings are connected to each other so that hydrogen collected in the individual fittings is discharged through a hydrogen product line.

2. A hydrogen purification module comprising:
   two or more unit hydrogen purification modules, each consisting of a plurality of unit cells, each of the unit cells comprising:
   two metal membranes which are selectively permeable to only hydrogen;
   a metal support ring disposed between the metal membranes and attached to the metal membranes at both its sides by diffusion bonding so as to support the metal membranes, the metal support ring being provided with a radial hole to allow hydrogen permeated through the metal membranes to flow therethrough;
   a porous plate disposed between the metal membranes so as to allow the hydrogen permeated through the metal membranes to flow therethrough; and
   a fitting coupled to the metal support ring and including a hole communicating with the hole of the metal support ring so as to allow the hydrogen in the porous plate to flow therethrough;
   wherein the individual fittings of the plurality of unit cells are connected to each other to construct the unit module, and two or more unit modules are disposed parallel to each other, thereby allowing hydrogen, collected in the individual fittings of the two or more unit modules, to be discharged through a hydrogen product line.

3. The hydrogen purification module as set forth in claim 2, wherein the number of the unit modules equals 4.

4. The hydrogen purification module as set forth in any of claims 1 to 3, wherein the attachment of the metal support ring and the fitting is achieved by welding or brazing.

5. The hydrogen purification module as set forth in any of claims 1 to 3, wherein the fitting is a reducer or a union.

6. A hydrogen separation reactor, comprising:
   a housing receiving the hydrogen purification module of any of claims 1 to 3;
   an inlet connected to the hydrogen purification module to allow mixed gases to be introduced into the hydrogen purification module therethrough;
   a hydrogen product line connected to the hydrogen purification module to discharge purified hydrogen by the hydrogen purification module; and
   a raffinate outlet, connected to the hydrogen purification module, to discharge the residual gases of the mixed gases.

* * * * *